June 12, 1956
J. W. NAREL ET AL
2,749,674
GRINDING MACHINE-WORK LOADER
Filed Nov. 8, 1954
3 Sheets-Sheet 2
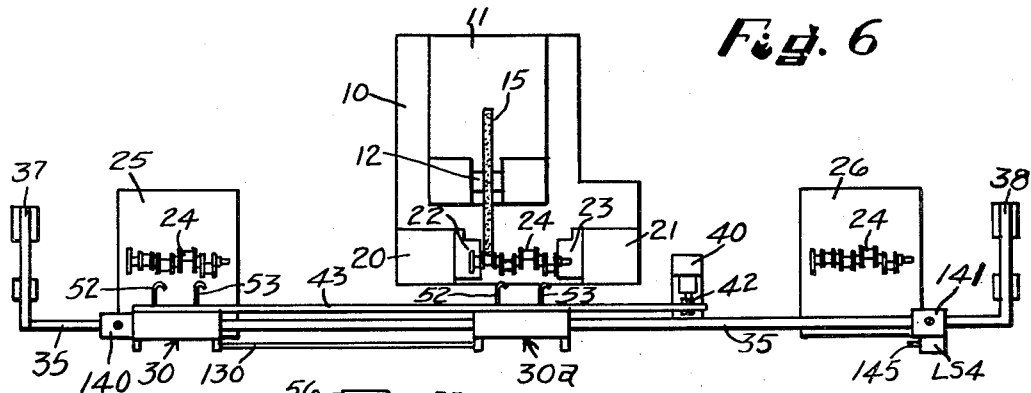
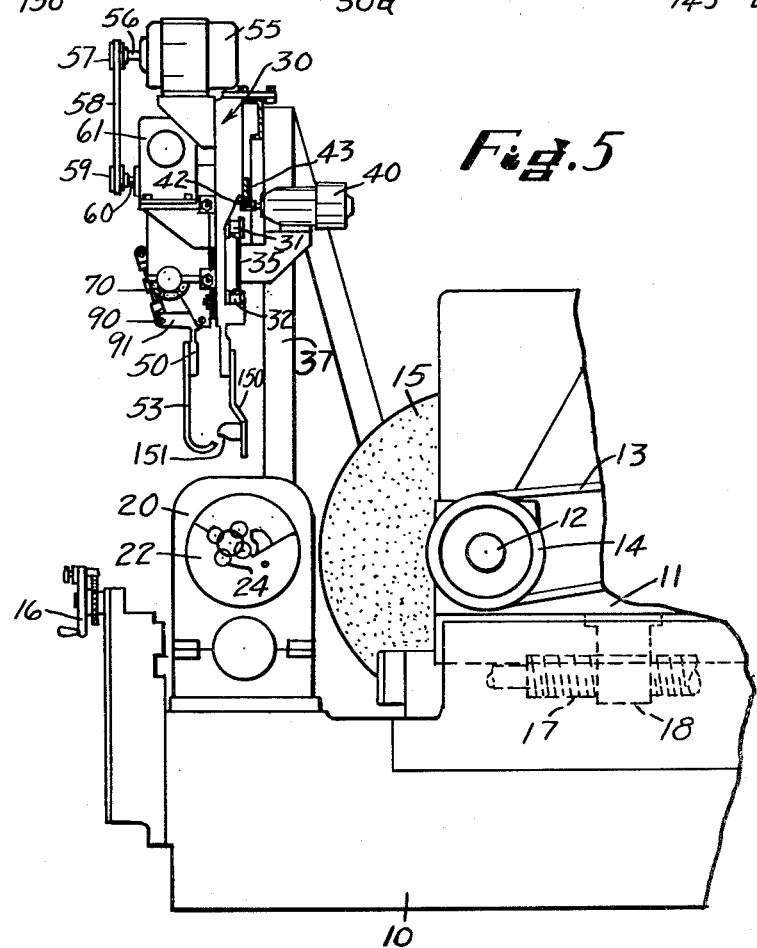
INVENTORS.
JOSEPH W. NAREL
GLOVER C. JOYCE
BY
Harold W. Eaton
ATTORNEY United States Patent Office 2,749,674
Patented June 12, 1956

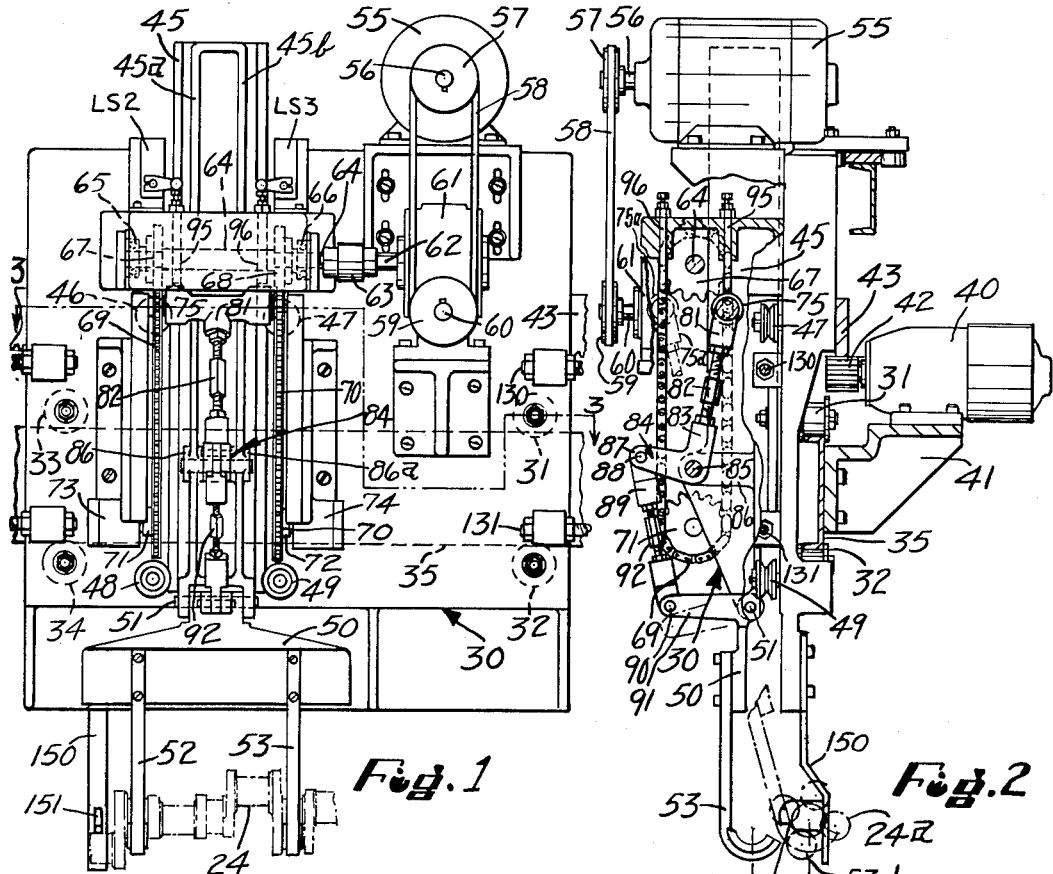

2,749,674

GRINDING MACHINE-WORK LOADER

Joseph W. Narel and Glover C. Joyce, Worcester, Mass., assignors to Norton Company, Worcester, Mass., a corporation of Massachusetts Application November 8, 1954, Serial No. 467,306

15 Claims. (Cl. 51—105)

This invention relates to machine tools, and more particularly to an automatic work loading and transferring apparatus for loading work pieces into a grinding machine and unloading finished work pieces therefrom.

One object of the invention is to provide a simple and thoroughly practical work loading and discharging apparatus for machine tools such as a crankpin grinding machine. Another object is to provide a work loading unit for automatically picking up a work piece from a loading station, transferring it into a grinding station for a grinding operation and thereafter automatically transferring the work piece to an unloading station.

Another object of the invention is to provide a longitudinally movable work loader unit having a vertically movable slide which is provided with spaced work loader hooks automatically to pick up a work piece for a loading and unloading operation. Another object of the invention is to provide a loading unit having a pair of spaced pivotally mounted work engaging hooks which are swung about a horizontal axis and moved vertically so that they travel in a substantially U-shaped path for picking up a work piece, transferring it and depositing it in a grinding or unloading station. Another object of the invention is to provide a longitudinally movable loader unit with a transversely movable slide which supports a pair of spaced work engaging elements together with a motor driven chain actuated mechanism for moving the work engaging elements through a substantially U-shaped path to facilitate picking up and transferring a work piece into a grinding position or onto an unloading station. Other objects will be in part obvious or in part pointed out hereinafter.

In the accompanying drawings in which is shown one of various possible embodiments of the mechanical features of the invention;

Fig. 1 is a front elevation of a work piece loading unit;

Fig. 2 is a right hand end elevation of the loading unit as shown in Fig. 1, having parts broken away and shown in section to clarify the construction;

Fig. 3 is a horizontal sectional view, taken approximately on the line 3—3 of Fig. 1;

Fig. 4 is a fragmentary sectional view, on an enlarged scale, taken approximately on the line 4—4 of Fig. 3 showing the connection between the actuating chain and the vertically movable slide of the loader unit;

Fig. 5 is a right hand fragmentary end elevation, on a reduced scale, of a grinding machine equipped with a crankshaft loading mechanism;

Fig. 6 is a diagrammatic plan view on a reduced scale of a single station grinding machine equipped with the crankshaft loading and transferring mechanism.

Figure 7:
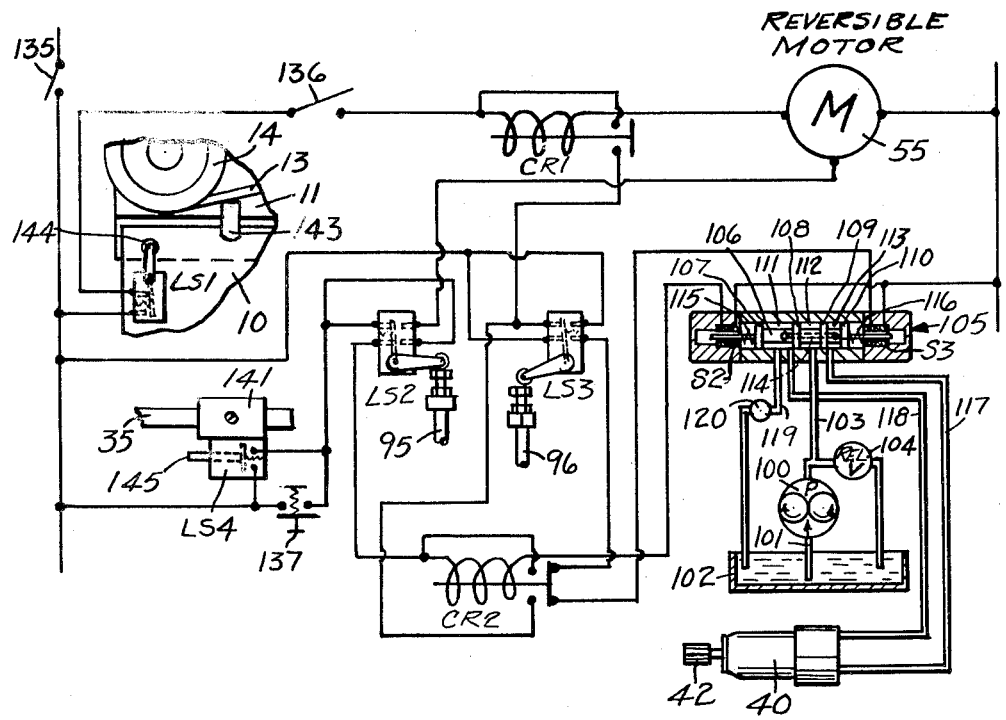
Fig. 7 is a combined electric and hydraulic diagram of the actuating mechanisms and the controls therefor.

A grinding machine has been illustrated in the drawings comprising a base 10 which supports a transversely movable wheel slide 11. The wheel slide 11 carries a rotatable wheel spindle 12 which may be driven by a motor (not shown) mounted on the wheel slide 11 which transmits power through multiple V-belts 13 to a multiple V-groove pulley 14 mounted on one end of the grinding wheel spindle 12. A grinding wheel 15 is mounted on the wheel spindle 12.

A wheel feeding mechanism is provided comprising a manually operable rotatable feed wheel 16 which is operatively connected to rotate a rotatable feed screw 17 which meshes with a half-nut 18 depending from the underside of the wheel slide 11. The details of the wheel feeding mechanism have not been illustrated since these may be identical with that shown in the U. S. Patent No. 2,572,529 to H. A. Silven, dated October 23, 1951, to which reference may be had for details of disclosure not contained herein. A manually operable wheel feeding mechanism has been illustrated. If desired, a power operated feeding mechanism, such as that disclosed in the above mentioned patent may be employed.

This invention is particularly applicable to a crankshaft grinding machine which is provided with a pair of spaced aligned work heads 20 and 21 (Fig. 6) which are provided with synchronously rotated axially aligned pot chucks 22 and 23 respectively for supporting and rotating opposite ends of a crankshaft 24 to be ground. The crankshaft loading and transferring mechanism may comprise a plurality of work loader units for picking up a crankshaft to be ground from a loading station 25 and lifting the crankshaft and transferring it into engagement with the pot chucks 22 and 23 for a grinding operation. Simultaneously therewith a crankshaft which has been ground is picked up from the pot chucks 22 and 23 and raised and traversed and deposited upon an unloading station 26. As shown in Fig. 6 only one grinding unit has been illustrated which is arranged to grind a single crankpin or portion of the crankshaft to be ground. If desired, a plurality of grinding stations may be provided, one for each crankpin on the shaft to be ground, such as, is disclosed in the pending application of H. A. Silven and Stewart S. Mader, Serial No. 434,484, filed June 4, 1954.

A longitudinally traversable loader unit 30 is illustrated in Figs. 1, 2 and 3. The loader unit 30 is provided with a plurality of spaced pairs of rollers 31—32 and 33—34 which ride upon the upper and lower surfaces of a longitudinally extending channel iron or slideway 35. The channel iron 35 is supported by a pair of spaced upwardly extending frames or columns 37 and 38 (Fig. 6). A traversing mechanism is provided for traversing the loader unit 30 longitudinally relative to the channel iron 35 which may comprise a fluid motor 40 supported on a bracket 41 which is fixedly mounted on the channel iron 35. The motor 40 is provided with a driven pinion 42 which meshes with a rack bar 43 fixedly mounted on the loader unit 30. It will be readily apparent from the foregoing disclosure that a rotary motion imparted to the pinion 42 will transmit a longitudinal traversing movement to the loader unit 30.

The loader unit 30 is provided with a vertically movable slide 45 which is supported by a plurality of pairs of anti-friction rollers 46—47 and 48—49 which are in turn supported on the loader unit 30. The slide 45 is arranged to move in a vertical direction in a manner to be hereinafter described. The slide 45 is provided with a pair of spaced parallel ribs 45a and 45b which serve to support the slide actuating mechanism. A pivotally mounted support 50 is supported by a stud 51 carried by the ribs 45a and 45b on the vertical slide 45. The pivotally mounted support 50 carries a pair of spaced vertically arranged work engaging hooks 52 and 53 which are arranged to engage spaced main bearings on the crankshaft 24 to be ground.

A suitable mechanism is provided for moving the slide 45 vertically and also to swing the pivotally mounted member 50 together with the hooks 52 and 53 to facilitate picking up a crankshaft from the loading station, raising it, transferring it longitudinally, lowering it and depositing it in supporting engagement with the pot chucks 22 and 23. This mechanism may comprise a motor driven mechanism comprising a reversible electric motor 55 mounted on the upper surface of the unit 30. The motor 55 is provided with a motor shaft 56 which supports a pulley 57. The pulley 57 is connected by a V-belt 58 with a pulley 59 mounted on the driveshaft 60 of a speed reducer unit 61. The speed reducer unit 61 may be of any of the well known speed reducer units now on the market. The speed reducer unit 61 is provided with a driven shaft 62 which is connected by a coupling 63 with a shaft 64 which is journalled in anti-friction bearings 65 and 66 fixedly mounted on the loader unit 30. The shaft 64 is provided with a pair of spaced sprockets 67 and 68 which drives a pair of spaced parallel link chains 69 and 70. The lower ends of the chains 69 and 70 wrap around idler sprockets 71 and 72 respectively which are rotatably journalled in bearings 73 and 74 respectively carried by the loader unit 30. It will be readily apparent that rotary motion of the motor shaft 56 will be imparted through the mechanism just described to transmit motion to the link chains 69 and 70.

The link chains 69 and 70 are operatively connected in a manner to be hereinafter described to transmit a predetermined vertical movement to the slide 45 and also to impart a predetermined swinging movement to the member 50 and the work engaging hooks 52—53. A cross head 75 is connected at its opposite ends to the link chains 69 and 70 in a manner illustrated in Fig. 4. The cross head 75 rotatably supports a bushing 76 at opposite ends thereof in needle bearings 77. The bushing 76 is provided with a pair of spaced pins 78 and 79 which replace a pair of adjacent studs on the link chains 69 and 70. The pins 78 and 79 pass through a collar 80 which is secured thereto by a pair of set screws. The cross head 75 is provided with a downwardly extending arm 81 which is connected by a turnbuckle 82 with an upwardly extending arm 83 of a bell crank lever 84. The bell crank lever 84 is pivotally supported by a rock shaft 85 which is supported in projecting bosses 86 and 86a formed integral with the ribs 45a and 45b respectively on the vertically movable slide 45. A second arm 87 of the bell crank lever 84 is connected by a stud 88 with the upper end of the link 89. The lower end of the link 89 is connected by a stud 90 with an arm 91 which is formed integral with the pivotally mounted member 50. The ling 89 is provided with a turnbuckle adjustment to facilitate varying the length of the link 89, that is, the distance between the stud 88 and the stud 90 so as to vary the position of the work engaging hooks 52 and 53. By manipulation of the turnbuckle 82, the slide 45 and the hooks 52—53 may be vertically adjusted as desired. By manipulation of the turnbuckle 92, the relative position of the pivoted member 50 together with the hooks 52—53 may be varied to facilitate setting up the work loader unit.

The electric motor 55 is preferably a reversible motor so that the link chains 69 and 70 together with the cross head 75 may be moved in either a clockwise or a counter-clockwise direction (Fig. 2). As shown in Fig. 2, the cross head 75 is shown in an uppermost position so that it raises a plunger 95, slidably mounted on the loader 30, to actuate a limit switch LS2. When the motor 55 is started to actuate the loader hooks 52—53 the link chains 69—70 start moving in a clockwise direction (Fig. 2) so that cross head travels downwardly in a U-shaped path and passes around the idler sprockets 71—72 and then moves upwardly into the broken line position 75a (Fig. 2) in which position the cross head 75 causes an upward movement of a plunger 96 to actuate a limit switch LS3.

During the downward movement of the cross head 75, a vertical movement is imparted to the vertical slide 45 to shift the loader hooks 52—53 downwardly into the position 53a (Fig. 2) in a substantially vertical path for the purpose of picking up a crankshaft to be ground from the loader station 25. At the time the loader hooks reach position 53a, the cross head 75 is about to start its travel about the idler sprockets 71—72 and due to the linkage previously described causes the loader hooks 52—53 to swing in a counter-clockwise direction so as to move through position 53b into position 53c (Fig. 2) so that the hooks 52—53 engage spaced main bearings on a crankshaft 24. The cross head 75 then starts a vertical upward movement toward position 75a to raise the hooks 52—53 and crankshaft 24 into positions 53d and 24a, respectively (Fig. 2) so that it is ready for a longitudinal traversing movement to transfer the crankshaft either from the loading station into the grinding station or from the grinding station into an unloading position.

A downwardly extending bracket 150 is fixedly mounted on the loader unit 30 (Fig. 2). The bracket 150 carries a cam 151 which is engaged by a crankpin on the crankshaft 24 as it moves upwardly into a transfer position to impart a rotary indexing movement to the crankshaft 24. This rotary indexing movement is provided to facilitate positioning the crankpin to be ground so that when the crankshaft 24 is transferred and lowered into engagement with the pot chucks 22—23, the crankpin to be ground is positioned for a grinding operation.

A hydraulic system (Fig. 7) is provided for supplying fluid under pressure for actuating the fluid motor 40 to traverse the work loader units 30 longitudinally. This mechanism may comprise a motor driven fluid pump 100 which draws fluid through a pipe 101 from a reservoir 102 and passes fluid under pressure through a pipe 103. A pressure relief valve 104 is provided in the pipe 103 to pass excess fluid under pressure directly to the reservoir 102 so as to maintain a substantially uniform operating pressure within the fluid system.

A piston-type control valve 105 is provided for controlling the admission to and exhaust of fluid from the rotary-type fluid motor 40. The valve 105 is provided with a slidably mounted valve member 106 having a plurality of spaced valve pistons 107, 108, 109 and 110 arranged to form a plurality of spaced valve chambers 111, 112 and 113. A central passage 114 extends longitudinally through the slidably mounted valve member 106 so as to connect the valve chamber 111 with the valve chamber 113. The valve 105 is normally held in a central position by a pair of balanced springs 115 and 116. A solenoid S2 is provided which when energized shifts the slidably mounted valve member 106 toward the right. A solenoid S3 is provided which when energized serves to shift the valve member 106 toward the left.

When the solenoid S2 is energized, the valve member 106 moves toward the right so that fluid under pressure passed through the pressure pipe 103 passes into the valve chamber 112, passes through a pipe 117 to the motor 40 to start a longitudinal traversing movement of the work loader units 30 toward the left. During this movement fluid may exhaust from the motor 40 through a pipe 118 into the valve chamber 111 and through an exhaust pipe 119 into the reservoir 102. A throttle valve 120 is provided in the exhaust pipe 119 to facilitate controlling the rate of exhaust of fluid from the motor 40 thereby to control the rate of traversing movement of the work loaders 30.

Similarly when the solenoid S3 is energized, the valve member 106 is shifted toward the left so that fluid under pressure passing through the pressure pipe 103 enters the valve chamber 112, may pass through the pipe 118 to the motor 40 to rotate the pinion 42 in the reverse direction so as to travel the loaders 40 in the opposite direction. During this latter movement, fluid may exhaust from the motor 40 through the pipe 117 into the valve chamber 113, through the central passage 114 in the valve member 106 into the valve chamber 111 and exhausts through the pipe 119 and the throttle valve 120 into the reservoir 102.

As illustrated diagrammatically in Fig. 6 a single station grinding arrangement has been illustrated in which two spaced loaders 30 and 30a are slidably mounted on the channel iron 35. The loaders 30 and 30a are both provided with work engaging hooks 52—53. The loaders 30 and 30a are connected together by tie-rods 130 and 131 (Figs. 1, 2 and 6) so that the two loader units may be moved together by a single fluid motor 40 mounted on the loader head 30. Each of the loader units 30 and 30a are provided with an identical mechanism to that shown in Figs. 1 and 2 with the exception of the traverse motor 40. The reversible electric motors 55 on each of the heads are connected to synchronously move the loader hooks 52—53 on each of the units 30 and 30a to pick up and deposit crankshafts to be ground.

As illustrated diagrammatically in Fig. 7 only one of the motors 55 has been illustrated. The second motor would be connected in parallel with the motor illustrated so that the movement of the two motors would be synchronized. In order to start the machine a pair of switches 135 and 136 are closed to render the loader circuit operative. In order to start the loader functioning, a manually operable momentary contact switch 137 is closed which serves to energize a relay switch CR2 and also to energize the solenoid S2 so that pressure is passed through the control valve 105, through the pipe 117, to the motor 40 to hold the loader assembly in a left hand end position with the loader 30 engaging an adjustable stop 140 carried by the channel iron 35. Assuming a crankshaft 24 to be in a grinding position supported by the pot chucks 22 and 23, the grinding wheel 15 is fed forward to grind a crankpin to a predetermined size during which movement a dog 143 on the wheel slide 11 (Fig. 7) rides idly over an actuating roller 144 of the limit switch LS1. After the crankpin has been ground to the desired size, the wheel slide 11 is moved rearwardly. During the rearward movement of the wheel slide, the dog 143 engaging the roller 144 closes the limit switch LS1 so as to energize a relay switch CR1 to start the reversible motors 55 thereby starting a clockwise movement of the cross head 75 in a U-shaped path (Fig. 2) to initiate a loading operation. The loader hooks 52—53 on each of the loader units 30 and 30a move downwardly to pick up a crankshaft 24 at the loader station 25 and at the grinding station to pick up a crankshaft 24 from the pot chucks 22 and to raise the crankshafts 24 to a transfer position.

When the motors 55 start movement of the loader chains 69—70, downward movement of the cross head 75 allows the plunger 95 to move downwardly thereby shifting the limit switch LS2 into engagement with the right hand contacts therein (Fig. 7). The left hand contacts of limit switch LS3 are now closed due to the fact that the plunger 96 is in a downward position, so that a holding circuit is set up to maintain the relay switches CR2 and CR1 energized during the pick-up motion of the loaders 30 and 30a. When the cross head 75 approaches position 75a (Fig. 2) the end of its clockwise travel in a U-shaped path, the cross head moves the plunger 96 upwardly to actuate the limit switch LS3. When the upward movement of the plunger 96 shifts the limit switch LS3 into the opposite position from that shown in Fig. 7, the holding circuits to both of the relays CR1 and CR2 are broken thereby stopping the reversible motors 55 and at the same time deenergizing the solenoid S2 so that the control valve 105 moves to a central or neutral position. The closing of the right hand contacts of limit switch LS3 serves to complete a circuit to energize the solenoid S3 to shift the control valve member 106 toward the left so that fluid under pressure is passed through the pipe 118 to start the motor 40 so as to traverse the loader units 30—30a toward the right. The movement of the loader units toward the right continues until the loader unit 30a engages an adjustable dog 141 on the channel iron 35 which limits the traversing movement toward the right to position loader unit 30 over the grinding station and loader unit 30a over the unloading station 26. As the loader 30a approaches its extreme right hand end position, the loader 30a engages an actuating plunger 145 of a limit switch LS4 to close a circuit through the right hand contacts of the limit switch LS2 to start the reversible motors 55 in the reverse direction to cause a downward movement of the loader hooks 52—53 on each of the units 30 and 30a to deposit a ground shaft 24 on the unloading station 26 and at the same time to deposit a shaft 24 to be ground into the pot chucks 22—23 after which the loader hooks move upwardly into a transfer position. As the loader hooks move upwardly to a transfer position, that is, with the cross head 75 returning to the full line position (Fig. 2), the plunger 95 is moved upwardly to return the limit switch LS2 into the position illustrated in Fig. 7 thereby breaking a circuit to stop the reversible motors 55. As the limit switch LS2 is actuated, the left hand contacts thereof are closed to energize the relay switch CR2 and to energize the solenoid S2 so as to shift the slidably mounted valve member 106 toward the right so that fluid under pressure passes through the pipe 117 to the fluid motor 40 to rotate the pinion 42 in the reverse direction thereby traversing the loader units 30—30a toward the left until the loader 30 engages the adjustable stop dog 140. The loader units remain in this position until the next crankpin has been ground after which the rearward movement of the wheel slide passes the dog 143 over the roller 144 to again close the limit switch LS1 to start another transferring cycle as above described.

The operation of the work loading and transferring apparatus will be readily apparent from the foregoing disclosure. Assuming all of the adjustments to have been previously made, a crankshaft is manually positioned in the pot chucks to start the cycle and a supply of crankshafts to be ground placed on the loader station 25. The switches 135, 136 and 137 are then actuated after which the loading mechanism as described serves automatically to pick up crankshafts 24 simultaneously from the loading station 25 and from the pot chucks 22—23 and raises them to a transferring position, after which the loaders 30—30a are traversed toward the right. The loaders 30—30a then deposit a new crankshaft 24 to be ground in the pot chucks 22—23 and simultaneously deposit a ground crankshaft on the unloading station 26. The loader hooks then move upwardly after which the loaders 30—30a move toward the left into their initial position where they remain until the next crankshaft has been ground. As previously expained only a single grinding station has been illustrated for grinding a single crankpin on a crankshaft. If desired, this loader mechanism may be applied to a machine having a plurality of grinding stations, one for each crankpin on the shaft to be ground, such as is disclosed in the pending application Ser. No. 434,484, filed June 4, 1954. In such an arrangement a plurality of additional loader units 30 are provided one for each additional grinding station so that crankshafts may be simultaneously transferred from the loading station to the first grinding station, between grinding stations, and from the last grinding station to the unloading station.

It will thus be seen that there has been provided by this invention, apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings

We claim:

1. In a grinding machine having a longitudinally movable work loader unit, a transversely movable slide thereon, a work engaging hook pivotally mounted on said slide, a motor driven mechanism including an endless flexible driving member, operative connections between said member and slide to move the slide transversely, and adjustable connections between said operative connections and said hook simultaneously to swing said work engaging hook so as to move in a substantially U-shaped path to facilitate picking-up and depositing work pieces.

2. In a grinding machine having a longitudinally movable work loader unit, a transversely movable slide thereon, a pair of spaced work engaging hooks arranged to engage spaced portions on a work piece which are pivotally mounted on said slide, a motor driven mechanism including an endless flexible driving member, operative driving connections between said member and slide to move said slide transversely, and adjustable connections between said driving connections and said hooks simultaneously to swing said work engaging hooks so that they move in a substantially U-shaped path to facilitate picking-up and depositing work pieces.

3. In a grinding machine, as claimed in claim 2, in combination with the parts and features therein specified, in which the motor driving means comprises an endless link chain driven thereby, means including an adjustable link connected between said chains and said slide to impart a transverse movement to said slide and an adjustable linkage between said link and said hooks to impart a swinging movement to said hooks in timed relation with the movement of said slide so that the hooks move in a substantially U-shaped path to facilitate picking-up and depositing work pieces.

4. In a grinding machine, as claimed in claim 2, in combination with the parts and features therein specified, in which the motor driven mechanism comprises a reversible electric motor, a pair of spaced endless link chains driven thereby, means including an adjustable link connected between said chains and the slide to impart a transverse movement to said slide, and adjustable linkage between said link and said hooks arranged to impart a swinging movement to said hooks in timed relation with the movement of said slide so that the hooks move in a substantially U-shaped path.

5. In a grinding machine having a longitudinally movable work loader unit, a transversely movable slide thereon, a slide actuating mechanism therefor including a motor driven endless link chain, adjustable link connections between the chain and slide, means to adjust the effective length of said link to facilitate varying the path of movement of the slide, a pivotally mounted member on said slide, a pair of spaced hooks on said member, and an adjustable linkage between said member and said adjustable link to impart a swinging movement to said hooks in timed relation with the movement of said slide so that the hooks travel in a substantially U-shaped path to facilitate picking-up and depositing work pieces.

6. In a grinding machine, as claimed in claim 5, in combination with the parts and features therein specified in which a turnbuckle adjustment is provided in the first adjustable link connections to facilitate varying the path of movement of said slide, and a second turnbuckle adjustment is provided in said second adjustable link to facilitate adjusting the position of the work engaging hooks relative to the slide.

7. In a grinding machine having a longitudinally movable work loader unit, a transversely movable slide thereon, a slide actuating mechanism therefor including a motor driven endless chain, adjustable link connections between the chain and slide, means to adjust the effective length of said link to facilitate varying the path of movement of the slide, a pivotally mounted member on said slide, a pair of spaced work engaging hooks on said member, and adjustable linkage between said member and said adjustable link to impart a swinging movement to said hooks in timed relation with the movement of said slide, and means to adjust the effective length of said adjustable link to vary the position of said hooks relative to the slide.

8. In a grinding machine having a longitudinally traversable work loader unit, means including a motor to traverse said loader unit longitudinally to transfer work pieces from a loading station to a grinding station and thereafter to an unloading station, a vertically movable slide on said unit, a slide actuating mechanism therefor including a motor therefor, an endless link chain driven by said motor, a bell crank lever pivotally supported on said slide, adjustable connections between one arm of said lever and the chain, a second bell crank lever pivotally supported in the lower end of said slide, a pair of spaced downwardly extending work engaging hooks pivotally mounted on a vertical arm of said second bell crank lever, and an adjustable link pivotally connected at its opposite ends to the second arm of each of said bell crank levers so as to impart a swinging movement to said hooks in timed relation with the vertical movement of the slide so that the hooks travel in a substantially U-shaped path.

9. In a grinding machine as claimed in claim 8, in combination with the parts and features therein specified of a cam fixedly mounted on said unit which is arranged to impart a rotary indexing movement to the work piece as it is raised to a transfer position.

10. In a grinding machine as claimed in claim 8, in combination with the parts and features therein specified of a bracket fixedly mounted on said unit, and a cam on said bracket to impart a rotary indexing movement to the work piece as it is raised to a transfer position.

11. In a grinding machine having a horizontally movable work loader unit, means including a motor operatively connected to traverse said unit, a vertically movable slide on said unit, a slide actuating mechanism including a reversible electric motor, a rotatable shaft driven thereby, a pair of spaced sprockets on said shaft, a pair of endless link chains meshing therewith, a pair of spaced rotatable idler sprockets meshing with and supporting the other ends of said chains, a cross head, pivotal connections between the opposite ends of said head and said chains, a bell crank lever pivotally supported on said slide, adjustable connections between said head and one arm of said bell crank lever, a second bell crank lever pivotally mounted on the lower end of said slide, a pair of spaced work engaging hooks fixedly mounted on one arm of said second bell crank lever, an adjustable link pivotally connecting the other arms of each of said bell crank levers which serves to impart a swinging movement to said hooks when the cross head moves about the idler sprockets, and electrically controlled means for said motor to move said chains so that the cross head travels in a substantially U-shaped path to impart a vertical movement to said slide and a swinging movement to said hooks to facilitate picking-up and depositing work pieces.

12. In a grinding machine as claimed in claim 11, in combination with the parts and features therein specified in which said electrically controlled means includes a pair of spaced slidably mounted plungers on said unit which are arranged in the path of movement of said cross head at the opposite ends of its movement, and means including a pair of limit switches actuated thereby to control said reversible motor.

13. In a grinding machine having a loader station, a grinding station, an unloading station, a pair of spaced axially aligned rotatable work supporting chucks on said grinding station, a transversely movable rotatable grinding wheel on said grinding station, a feeding mechanism to move said grinding wheel toward and from said chucks, and a work loading and transferring mechanism including a pair of spaced longitudinally movable work loader units, a horizontal slideway therefor, adjustable stop dogs on said slideway to limit the longitudinal movement of said units, means including a fluid motor to traverse said units longitudinally, a control valve therefor, a pair of spaced work engaging hooks on each of said units, means including a reversible electric motor driven chain to move said hooks through a substantially U-shaped path to pick up and discharge work pieces therefrom, means including a limit switch actuated by the rearward movement of said grinding wheel which is operatively connected to start said electric motor to cause a downward movement of said hooks simultaneously to pick-up a new crankshaft at the loading station and a ground crankshaft at the grinding station and to raise them to a transfer position, means including a limit switch actuated by and in timed relation with said chain to actuate said control valve to start said fluid motor to traverse said loaders longitudinally, and a limit switch actuated by and in timed relation with the longitudinal movement of said loaders to start said electric motor in the reverse direction to cause a downward movement of said hooks to deposit a crankshaft to be ground at the grinding station and a ground crankshaft at the unloading station.

14. In a grinding machine, as claimed in claim 13 in combination with the parts and features therein specified of a limit switch actuated by and in timed relation with said chain when the hooks are in an uppermost position to start said fluid motor so as to traverse the loader units in the reverse direction to their initial position.

15. In a grinding machine having a loading station, a grinding station, an unloading station, a pair of spaced axially aligned rotatable work supporting chucks on said grinding station, a transversely movable rotatable grinding wheel on said grinding station, a feeding mechanism to move said grinding wheel toward and from said chucks, and a work loading and transferring mechanism including a plurality of spaced longitudinally movable work loader units, a horizontal slideway therefor, adjustable stop dogs on said slideway to limit the longitudinal movement of said units, means including a fluid motor simultaneously to traverse said units longitudinally, a control valve therefor, a vertically arranged slide on each of said units, a pair of spaced loader hooks on each of said slides, means including a reversible motor driven chain on each of said units to move said hooks through a substantially U-shaped path to pick-up and discharge work pieces therefrom, means including a limit switch actuated by the rearward movement of the grinding wheel to start said electric motor to cause downward movement of said hooks simutlaneously to pick-up a new crankshaft at the loading station and a ground crankshaft at the grinding station and to raise them to a transfer position, means including a limit switch actuated by and in timed relation with said chain to actuate said control valve to start the fluid motor to traverse the loader units longitudinally, and a limit switch actuated in timed relation with the longitudinal movement of said units to start said electric motor in the reverse direction to cause a downward movement of said hooks to deposit a crankshaft to be ground at the grinding station and a ground shaft at the unloading station.

References Cited in the file of this patent
UNITED STATES PATENTS 2,623,429    Meyer   ---------------- Dec. 30, 1952

FOREIGN PATENTS 191,109    Germany   -------------- Nov. 6, 1907